United States Patent
Seigler et al.

(10) Patent No.: US 9,152,568 B1
(45) Date of Patent: Oct. 6, 2015

(54) ENVIRONMENTAL-BASED DEVICE OPERATION

(75) Inventors: Michael Allen Seigler, Eden Prairie, MN (US); John West Dykes, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 313 days.

(21) Appl. No.: 13/311,477

(22) Filed: Dec. 5, 2011

(51) Int. Cl.
G06F 12/00 (2006.01)
G06F 12/08 (2006.01)
G06F 12/02 (2006.01)
G06F 3/06 (2006.01)

(52) U.S. Cl.
CPC ............ G06F 12/0866 (2013.01); G06F 3/068 (2013.01); G06F 3/0616 (2013.01); G06F 3/0635 (2013.01); G06F 12/0246 (2013.01); G06F 2212/217 (2013.01)

(58) Field of Classification Search
None
See application file for complete search history.

(56) References Cited

U.S. PATENT DOCUMENTS

| | | | | |
|---|---|---|---|---|
| 5,890,209 | A * | 3/1999 | Dobbek | 711/112 |
| 6,076,137 | A * | 6/2000 | Asnaashari | 711/103 |
| 6,405,277 | B1 * | 6/2002 | Jen et al. | 711/4 |
| 6,438,648 | B1 * | 8/2002 | McKean et al. | 711/114 |
| 6,751,757 | B2 * | 6/2004 | Biskup et al. | 714/54 |
| 6,772,352 | B1 * | 8/2004 | Williams et al. | 713/300 |
| 6,779,088 | B1 * | 8/2004 | Benveniste et al. | 711/145 |
| 6,895,500 | B1 * | 5/2005 | Rothberg | 713/1 |
| 7,099,794 | B2 * | 8/2006 | LeClerg et al. | 702/130 |
| 7,171,080 | B2 | 1/2007 | Rausch | |
| 7,257,684 | B1 * | 8/2007 | Sinha et al. | 711/154 |
| 7,324,296 | B1 | 1/2008 | DeRosa | |
| 7,333,283 | B2 | 2/2008 | Akamatsu et al. | |
| 7,450,326 | B2 | 11/2008 | Hidaka | |
| 7,596,714 | B2 * | 9/2009 | Rothman et al. | 714/6.13 |
| 7,612,996 | B2 | 11/2009 | Atkins et al. | |
| 7,797,506 | B2 * | 9/2010 | Rangarajan et al. | 711/170 |
| 7,830,765 | B2 | 11/2010 | Mukai | |
| 7,849,261 | B2 * | 12/2010 | Pherson et al. | 711/114 |
| 7,855,849 | B2 | 12/2010 | Dina et al. | |

(Continued)

OTHER PUBLICATIONS

Baird et al. "High-Pressure, High-Temperature Well Logging, Perforating and Testing." Oilfield Review, Summer 1998.*

(Continued)

*Primary Examiner* — Kevin Verbrugge
(74) *Attorney, Agent, or Firm* — Cesari & Reed LLP; Kirk A. Cesari; Christian W. Best (57) ABSTRACT

The disclosure is related to systems and methods for temperature-based device operation. In one example, a device may include a first memory and a temperature detection module adapted to measure a temperature of the device and modify a data storage behavior of the first memory based on the temperature. The device may further comprise a second memory, and the temperature detection module may direct that data be written to the first memory less frequently, and be written to the second memory more frequently when a threshold temperature is exceeded. The temperature detection module may also implement operating limitations for the device when a threshold temperature is exceeded, such as restricting execution of background diagnostics or implementing other operating limitations. In some embodiments, other environmental factors such as humidity, altitude, air pressure, physical shock, or other factors may be monitored and the device operation may be modified based on those factors.

20 Claims, 4 Drawing Sheets

(56) References Cited

U.S. PATENT DOCUMENTS

| | | |
|---|---|---|
| 7,880,988 B2 | 2/2011 | Ahn |
| 7,961,417 B2 | 6/2011 | Seigler et al. |
| 7,965,464 B2 | 6/2011 | Batra et al. |
| 7,984,250 B2 * | 7/2011 | Steinbrecher et al. ........ 711/154 |
| 8,090,902 B1 * | 1/2012 | Bennett et al. ................ 711/111 |
| 8,560,801 B1 * | 10/2013 | Pendharkar et al. .......... 711/170 |
| 8,788,779 B1 * | 7/2014 | Horn ............................. 711/167 |
| 2003/0053240 A1 * | 3/2003 | Bruner et al. .................. 360/69 |
| 2003/0191889 A1 * | 10/2003 | Forrer, Jr. ...................... 711/112 |
| 2004/0054849 A1 * | 3/2004 | Deenadhayalan et al. .... 711/112 |
| 2005/0015567 A1 * | 1/2005 | Zohar et al. ................... 711/203 |
| 2006/0253204 A1 * | 11/2006 | Papanikolaou et al. ......... 700/90 |
| 2007/0016726 A1 * | 1/2007 | Zohar et al. ................... 711/114 |
| 2007/0050569 A1 * | 3/2007 | Haustein et al. .............. 711/154 |
| 2008/0005469 A1 * | 1/2008 | Pherson et al. ............... 711/114 |
| 2008/0077735 A1 * | 3/2008 | Kishi et al. .................... 711/113 |
| 2008/0180827 A1 * | 7/2008 | Zhu et al. ........................ 360/59 |
| 2008/0228959 A1 * | 9/2008 | Wang ............................. 710/22 |
| 2008/0269954 A1 * | 10/2008 | Lev et al. ...................... 700/299 |
| 2008/0270691 A1 * | 10/2008 | Belady .......................... 711/114 |
| 2008/0285351 A1 * | 11/2008 | Shlick et al. ............. 365/185.18 |
| 2009/0094406 A1 * | 4/2009 | Ashwood ...................... 711/103 |
| 2010/0023678 A1 * | 1/2010 | Nakanishi et al. ............. 711/114 |
| 2010/0100664 A1 * | 4/2010 | Shimozono ................... 711/103 |
| 2010/0138682 A1 * | 6/2010 | Obana et al. .................. 711/154 |
| 2011/0022801 A1 * | 1/2011 | Flynn ............................ 711/120 |
| 2011/0029150 A1 * | 2/2011 | Wyatt ............................ 700/299 |
| 2011/0107037 A1 * | 5/2011 | Yoshida ........................ 711/154 |
| 2011/0161712 A1 * | 6/2011 | Athalye et al. ................ 711/163 |
| 2011/0185224 A1 * | 7/2011 | Tsai et al. ...................... 711/103 |
| 2011/0191535 A1 * | 8/2011 | Yuasa ............................ 711/113 |
| 2011/0208904 A1 * | 8/2011 | Fujito et al. ................... 711/103 |
| 2011/0238887 A1 | 9/2011 | Bazzani |
| 2011/0271052 A1 * | 11/2011 | Omori et al. .................. 711/114 |
| 2011/0283235 A1 * | 11/2011 | Kling et al. ................... 715/832 |
| 2011/0302353 A1 * | 12/2011 | Confalonieri et al. ......... 711/103 |
| 2011/0314221 A1 * | 12/2011 | Kawada et al. ............... 711/114 |
| 2012/0016533 A1 * | 1/2012 | Lim et al. ...................... 700/299 |
| 2012/0089854 A1 * | 4/2012 | Breakstone et al. .......... 711/102 |
| 2012/0102259 A1 * | 4/2012 | Goss et al. .................... 711/103 |
| 2012/0112907 A1 * | 5/2012 | Flath ............................. 711/154 |
| 2012/0150869 A1 * | 6/2012 | Wang et al. ................... 707/747 |
| 2012/0290773 A1 * | 11/2012 | Naccache ...................... 711/103 |
| 2013/0073783 A1 * | 3/2013 | Cao et al. ...................... 711/103 |
| 2013/0080680 A1 * | 3/2013 | Chu ............................... 711/102 |
| 2013/0103900 A1 * | 4/2013 | Chiu .............................. 711/112 |
| 2013/0138901 A1 * | 5/2013 | Cordero et al. ............... 711/162 |
| 2013/0290600 A1 * | 10/2013 | Tzafrir .......................... 711/103 |

OTHER PUBLICATIONS

Kameshwari R. "Predictive Modelling for Migration within a Secondary Storage Level." Indian Institute of Science, Bangalore, May 2003.*

Meruva. "LFSM—a system to optimize the random write performance of FLASH memory." Stony Brook University, May 2010.*

* cited by examiner

ENVIRONMENTAL-BASED DEVICE OPERATION

BACKGROUND

Data storage devices may perform differently at different temperatures. For example, higher temperatures may compromise the reliability of data stored to some storage mediums, or may affect the performance or durability of component parts in the device.

SUMMARY

A device may comprise a first memory and a temperature detection module (TDM). The TDM may be adapted to measure a temperature of the device and modify a data storage behavior of the first memory based on the temperature.

In another embodiment, a device may comprise a controller configured to detect a temperature of a data storage device, and to write data to a second memory if the temperature exceeds a threshold value.

Another embodiment may be a method comprising detecting a temperature of a data storage device and modifying the operation of the data storage device based on the temperature.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
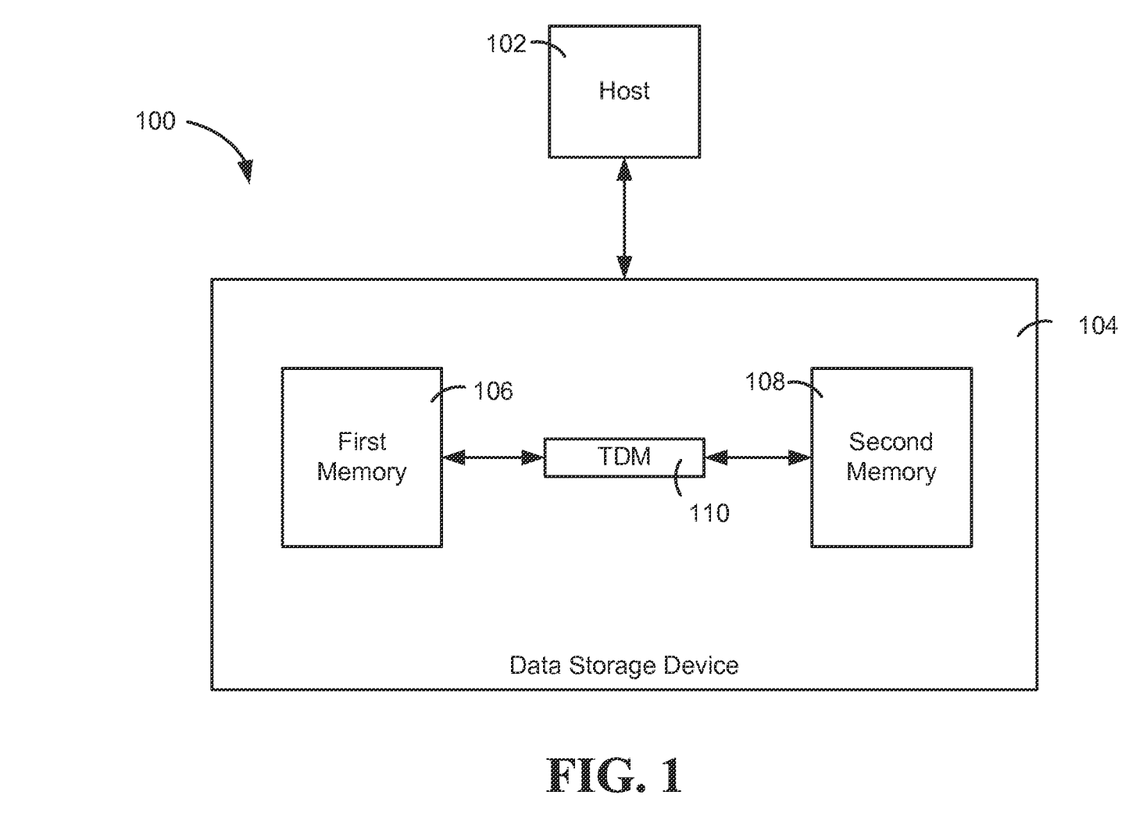
FIG. 1 is a diagram of an illustrative embodiment of a system for temperature-based device operation.

FIG. 1 shows a diagram of an illustrative embodiment of a system for temperature-based device operation, generally designated 100. The system 100 may include a host 102 and a data storage device (DSD) 104. The host 102 may also be referred to as the host system or host computer. The host 102 can be a desktop computer, a laptop computer, a server, a personal digital assistant (PDA), a telephone, a music player, another electronic device, or any combination thereof. Similarly, the DSD 104 may be any of the above-listed devices, or any other device which may be used to store or retrieve data. Further, the DSD 104 can be a stand-alone device not connected to a host 102.

The data storage device 104 can include a first memory 106, a second memory 108, and a temperature detection module (TDM) 110. In some embodiments, the first memory 106 may be a nonvolatile storage medium of the DSD 104, such as a disc data storage medium, and the second memory 108 may be a data buffer or cache, where the second memory 108 may be less influenced by variations in temperature than the first memory 106. For example, the DSD 104 may be a hybrid disc drive with a disc data storage medium and a non-volatile solid state memory, such as a Flash memory. The first memory 106 and the second memory 108 can be any form of volatile or non-volatile memory capable of storing data, such as Flash memory, ROM, RAM, DRAM, SRAM, other solid state memory, magnetic memory, optical memory, or any combination thereof.

The temperature detection module 110 can monitor the temperature of the DSD 104 or component parts of the DSD 104. The TDM 110 may be software, a programmable controller, a circuit, a CPU, or any combination of elements capable of sensing or processing temperature information. The TDM 110 may be designed to monitor the temperature of a single or multiple locations or elements of the DSD 104. The TDM 110 may also be designed to determine a length of time the DSD 104 or a component part operates beyond a temperature threshold.

The TDM 110 may be configured to modify a behavior of the DSD 104 if the TDM 110 determines that a temperature threshold has been exceeded, or if a temperature threshold has been exceeded for a designated length of time. For example, the TDM 110 may modify the behavior of the DSD 104 if the DSD has been operating above a threshold temperature of 70° C. for over two minutes. The behavior may be modified so as to impose operating limitations on the DSD 104, such as restricting background diagnostics, reducing processing speeds, reducing a frequency of commands executed up to or including not processing user commands at all, reducing a motor speed or seek speed, stopping spinning of one or more magnetic storage discs entirely, or entering a power saving mode. Another example of modified behavior may be to process commands only within certain data zones of a memory of the DSD 104, thereby restricting seek length and power consumption. As a means of implementing this example, data could be divided into different classifications and mapped to different disk locations depending on the classification.

The TDM 110 may be configured to keep a log of time & temperature. This log may be used to focus diagnostics on certain components of a DSD 104, to warn users of how long a device or component has been operating above a threshold temperature, to anticipate impending device or component failures, to accumulate data regarding component or device operation at or above threshold temperatures, or for other purposes or any combination thereof.

Further, the TDM 110 may modify how data is recorded or read by the DSD 104 by changing a frequency or destination of data storage behavior. The term 'frequency,' as used herein, refers to how often a behavior is performed. As an example of modifying read or write behavior, when the threshold temperature has been exceeded the TDM 110 may direct that data be written to the first memory 106 less frequently, including that data not be written to the first memory 106 at all. Data not written to the first memory 106 may be written to the second memory 108. For example, the host 102 may send data with a Logical Block Address (LBA) mapped to a physical location of the first memory 106, but if the TDM 110 detects that the threshold temperature has been exceeded it may direct that data be written to the second memory 108 instead.

The TDM 110 may implement a behavior mode where data may be read from a first memory 106, but not written to the first memory. If the TDM 110 determines that the temperature has fallen below the temperature threshold (e.g. 60° C.), or fallen below a second, lower temperature threshold (e.g. 55° C.), the TDM 110 may direct that any data written to the second memory 108 be moved to the first memory 106. If the TDM 110 determines that the second memory 108 is approximately at capacity, it may likewise direct that data stored in the second memory 108 be moved to the first memory 106. The data could be organized in the second memory 108 so that data could be moved to the first memory 106 in an efficient manner, such as by a continuous write operation. In some embodiments, a DSD 104 operating in this fashion may write data at or near peak performance while minimizing operations that may be negatively influenced by a high temperature. As an example, some data storage mediums may be more susceptible to write errors due to high temperatures than other data storage mediums, so switching between two storage mediums at high temperatures may improve data storage reliability.

A TDM 110 could be adapted to monitor for a multiplicity of temperature thresholds, with different thresholds resulting in the TDM 110 modifying the behavior of the DSD 104 differently based on one or more corresponding thresholds. For example, if a first threshold is passed (e.g. 60° C.), the TDM 110 may limit background diagnositics; if a second temperature threshold is passed (e.g. 70° C.), the TDM 110 may restrict write operations to the first memory 106; and if a third temperature threshold is passed (e.g. 90° C.), the TDM 110 may shut down the DSD 104 entirely. In some embodiments, the TDM 110 may monitor if certain high temperature thresholds are exceeded (e.g. 90° C.) at which the integrity of one or more components of the DSD 104 may be compromised, and adjust device behavior accordingly.

The TDM 110 may alter how the DSD 104 stores data if the temperature threshold has been exceeded. The TDM 110 may be implemented in a hybrid DSD 104 having a magnetic disc with heat assisted magnetic recording (HAMR) technology and a nonvolatile solid state memory, where the TDM 110 may be configured to monitor a temperature of a laser element of the HAMR technology. If the TDM 110 detects that a temperature threshold had been exceeded, or optionally if the temperature threshold had been exceeded for a specific length of time, the TDM 110 may direct that data, which may initially be intended to be written to the magnetic disc, be recorded to the nonvolatile solid state memory rather than to the magnetic disc. In some embodiments, data may initially be intended for a specific data storage medium based on a logical block address received from the host 102, the logical block address can have an associated physical location at which to store the data associated with the logical block address. The physical location of the data associated with the logical block address may be initially associated with a specific data storage medium, such as a magnetic disc.

In other embodiments, the TDM 110 may direct that data be written to the magnetic disc less frequently, and written to the nonvolatile solid state memory more frequently. If the TDM 110 determines that the temperature has fallen below a second threshold, or if the nonvolatile solid state memory is nearing capacity, the TDM 110 may direct that the data stored to the nonvolatile solid state memory be moved to the magnetic disc. Limiting operation of the HAMR technology, including the laser, by not storing data to the magnetic disc may extend an operating life of the laser and the DSD 104.

The TDM 110 may continually monitor the temperature, or may monitor the temperature or otherwise operate based on other circumstances such as: monitoring initiated by a user; monitoring initiated by other software or hardware component(s); monitoring initiated based on time intervals, such as every thirty seconds; monitoring initiated based on a period of continuous or intermittent data writes; any other circumstances that could trigger a temperature monitoring operation; or any combination thereof.

As an example, the TDM 110 may be designed to display information to a user and allow user oversight of the operation of the TDM 110. The TDM 110 could cause a display to show the temperature or an indicator to a user, and the user could manually direct whether the TDM 110 implements behavior modifications for the DSD 104, or select which behavior modifications the TDM 110 implements. In some embodiments, the TDM 110 may provide warnings to the user that operating the DSD 104 at elevated temperatures may negatively impact a performance or longevity of the DSD 104, and the user could elect to implement behavior modifications or to allow the DSD 104 to operate without behavior modifications.

Figure 2:
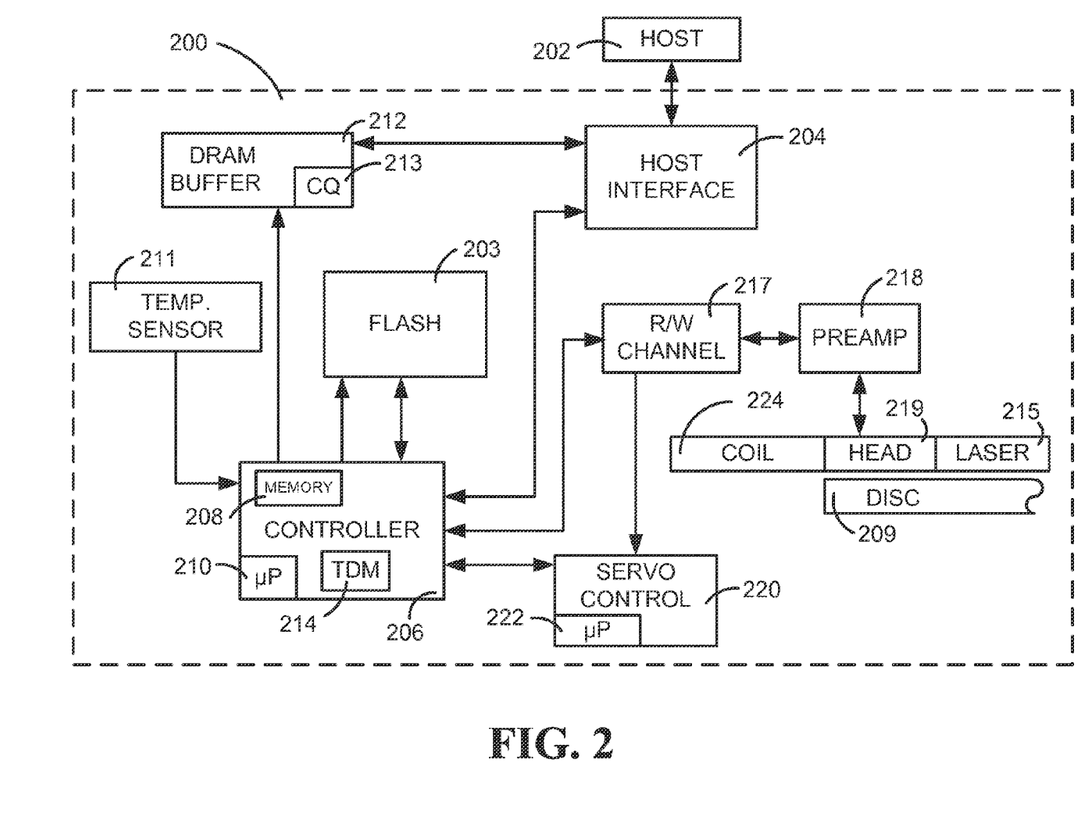
FIG. 2 is a diagram of another illustrative embodiment of a system for temperature-based device operation.

FIG. 2 depicts a diagram of another illustrative embodiment of a system for temperature-based device operation, generally designated 200. Specifically, FIG. 2 provides a functional block diagram of a disc drive data storage device (DSD) 200. The DSD 200 may be a data storage device such as the device 104 shown in FIG. 1. The data storage device 200 can communicate with a host device 202 (such as the host system 102 shown in FIG. 1) via a hardware/firmware based host interface circuit 204 that may include a connector (not shown) that allows the DSD 200 to be physically removed from the host 202. The buffer 212 can temporarily store user data during read and write operations and can include a command queue (CQ) 213 where multiple pending access operations can be temporarily stored pending execution. A nonvolatile solid state memory 203, such as Flash memory, can be included for additional cache or buffer memory, or to provide additional data storage for the DSD 200.

The DSD 200 can include a programmable controller 206 with associated memory 208 and processor 210. The controller 206 may also include a temperature detection module (TDM) 214, which may be independent of the controller 206, or part of the controller 206. The TDM 214 may monitor temperature directly, or one or more temperature sensors 211 may be connected to the TDM 214 or the controller 206. The TDM 214 and any temperature sensor(s) 211 may be situated to monitor the temperature at one or more locations in the DSD 200. For example, a temperature sensor could be situated to monitor the temperature of a base plate, of a circuit board such as an E-block, of a read/write head slider, or of the head(s) 219 or laser(s) 215 themselves. Devices or components that perform other functions may also be adapted to act as a temperature sensor 211; for example, components that monitor or control the fly height of the disc(s) 209, coils 224, or power monitors for the laser(s) 215.

Further, FIG. 2 shows the DSD 200 can include a read/write (R/W) channel 217, which can encode data during write operations and reconstruct user data retrieved from disc(s) 209 during read operations. A preamplifier/driver circuit (preamp) 218 can apply write currents to the head(s) 219 and provides pre-amplification of readback signals. The laser(s) 215, such as those used by heat-assisted magnetic recording (HAMR) devices, may be a part of, joined to, or situated near to and operably controlled with the head(s) 219 to perform write operations on the disc(s) 209. A servo control circuit 220 may use servo data to provide the appropriate current to the coil 224 to position the head(s) 219 and the laser(s) 215. The controller 206 can communicate with a processor 222 to move the head(s) 219 and laser(s) 215 to the desired locations on the disc(s) 209 during execution of various pending commands in the command queue 213.

The TDM 214 may be adapted to perform all the functions and processes discussed for TDMs herein; for example, monitoring temperature(s) within the DSD 200 and modifying a behavior of the DSD 200 when a temperature threshold is exceeded. In some embodiments, a behavior may be modified after a temperature threshold has been exceeded for a length of time. Modifications of operating behavior may include limiting processes of the DSD 200, such as reducing background diagnostics, or changing the frequency at which data is written to the disc(s) 209 or nonvolatile solid state memory 203. For example, the TDM 214 may direct that data write operations to the disc(s) 209 be made intermittently or not at all, and that excess data be written to the nonvolatile solid state memory 203.

In another embodiment, the TDM 214 may modify a read-after-write operation. For example, when writing data to a data storage medium, the controller 206 may direct that a read operation immediately follow a write operation to verify the data was written. The read-after-write operation can enhance the integrity of the data since it enables a re-write of the data from a write cache if an error is detected. Thus, if there is an error in reading the data, the controller 206 may rewrite the data. However, if the TDM 214 has determined a temperature threshold has been exceeded, the controller 206 or the TDM 214 may direct that a data re-write operation occur at a different data storage medium than a previous data write operation. In a specific example, a first write operation may occur at the disc 209 (thus, using the HAMR technology and the laser 215 in the example of FIG. 2), a read-after-write verification may indicate an error in the written data, and a subsequent writing (i.e. re-write) of the data may be to the nonvolatile solid state memory 203.

Figure 3:
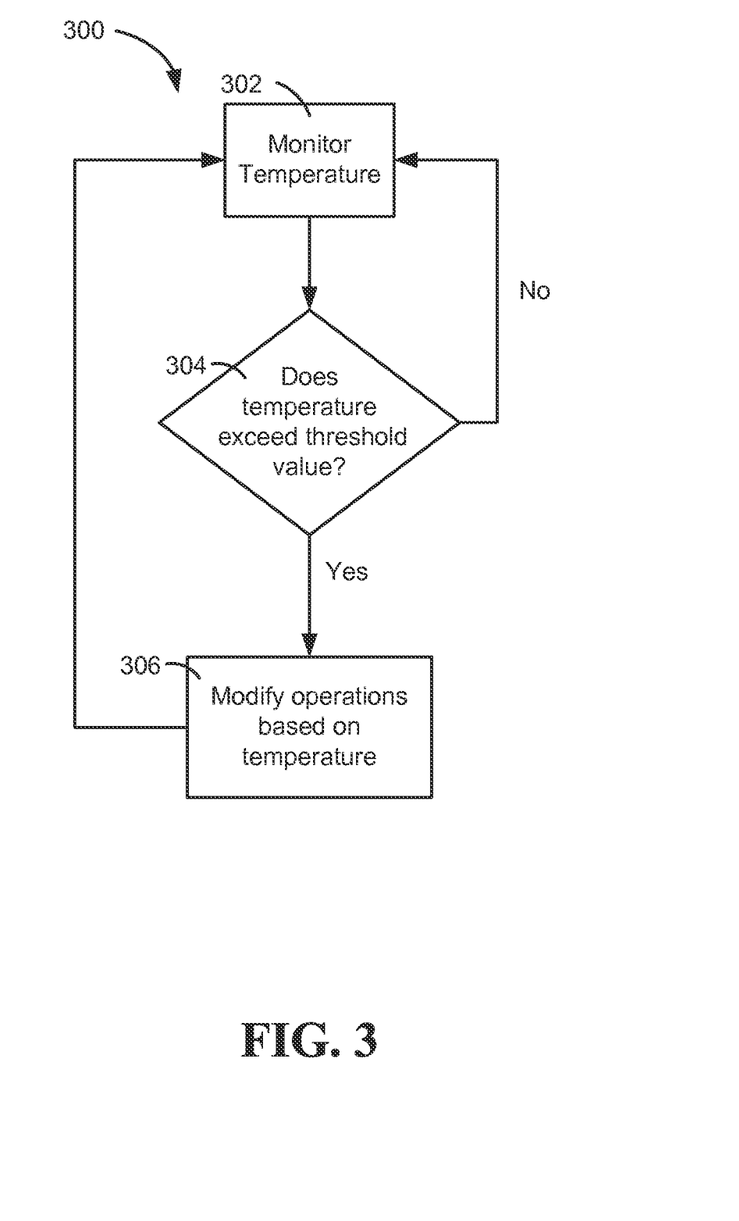
FIG. 3 is a flowchart of an illustrative embodiment of a method for temperature-based device operation.

Referring to FIG. 3, a flowchart of an illustrative embodiment of a method 300 for temperature-based device operation is shown. The method 300 can include monitoring the temperature of a device, at 302. The method 300 may involve determining if a threshold temperature has been exceeded, at 304. If the temperature has not been exceeded, the method 300 may continue monitoring the temperature, at 302. If the threshold temperature has been exceeded, the method 300 can involve modifying the operations of the device based on the temperature, at 306. The method 300 may resume or continue monitoring the temperature, at 302, after modifying operations of the device at 306.

Modifications to the device operations at 306 may include any of the example behavior or operation modifications implemented by TDMs, or any other modifications that may be apparent to those of skill in the art. For example, the method 300 may limit processes of the device, such as preventing background diagnostics. In another possible modification of the operations, the method 300 may change the frequency at which data is written to one or more memories. In another example, the method 300 may reduce the frequency of write operations to a first magnetic disc memory, and write excess data to a second solid-state memory.

Figure 4:
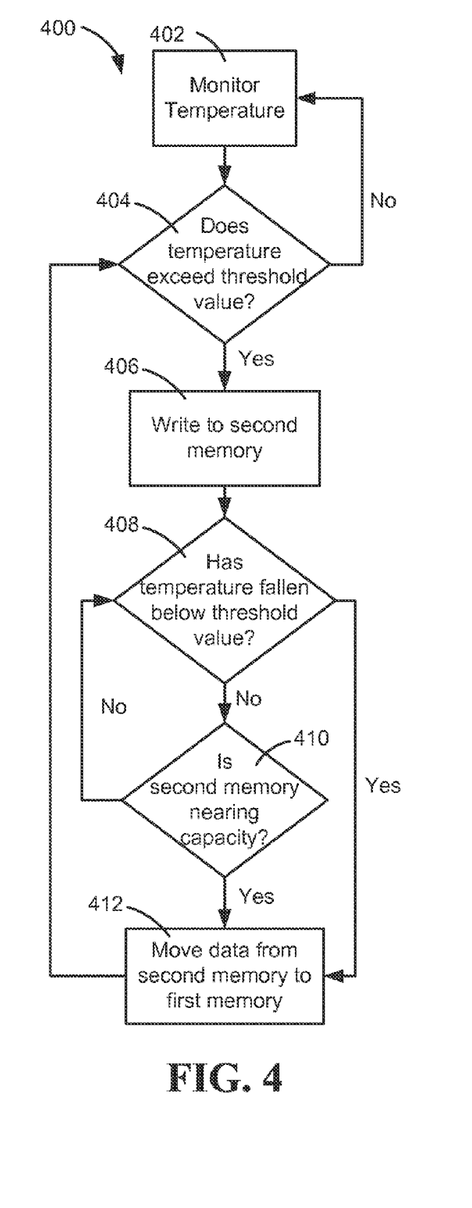
FIG. 4 is a flowchart of an illustrative embodiment of a method for temperature-based device operation.

FIG. 4 depicts a flowchart of an illustrative embodiment of a method 400 for temperature-based device operation, as it may apply to a data storage device ("DSD"). The method 400 may apply to a data storage device with a first and second nonvolatile memory, such as the DSD 104 depicted in FIG. 1 or the DSD 200 depicted in FIG. 2.

The method 400 may involve monitoring a temperature of a DSD, at 402. The method 400 may determine if a threshold temperature has been exceeded, at 404. If the threshold temperature has not been exceeded, temperature monitoring may continue at 402. If the temperature has exceeded the threshold temperature, the method 400 may direct that the DSD write data to a second memory, at 406. This can involve a reduction or total cessation of data write operations to a first memory.

The method 400 may consider if the temperature has fallen below a threshold temperature, at 408. This may be the initial threshold temperature considered at 404, or it may be a second, lower temperature threshold; for example, an initial temperature threshold of 60° C., and a second, lower temperature threshold of 55° C. If the temperature has fallen below a threshold temperature, at 408, the method 400 may move data from the second memory to the first memory, at 412. If the temperature has not fallen below a threshold temperature, the method 400 may continue monitoring the temperature at 408 and the second memory space remaining at 410.

The method 400 may consider if the second memory is nearing capacity, at 410. If the second memory is approximately full, or has passed a data storage threshold, the method 400 may involve moving data from the second memory to the first memory, at 412. If the second memory still has sufficient space remaining, the method 400 can continue monitoring the temperature at 408 and the second memory space remaining at 410.

Once a condition has been met such that the method 400 directs that data be moved from the second memory to the first memory, at 412, the method can re-evaluate whether the temperature of the DSD exceeds a threshold value, at 404. If the temperature still exceeds the threshold value, data can continue to be written to second memory, at 406; otherwise, the method 400 may resume monitoring the temperature at 402.

The steps in the method 400 are presented in a specific order in FIG. 4. However, it should be apparent to one of skill in the art that additional steps may be included, or that some steps may be excluded or performed in a different order than that depicted in FIG. 4. For example, steps 408 and 410 could be performed in sequence in either order, or performed in parallel.

Figure 5:
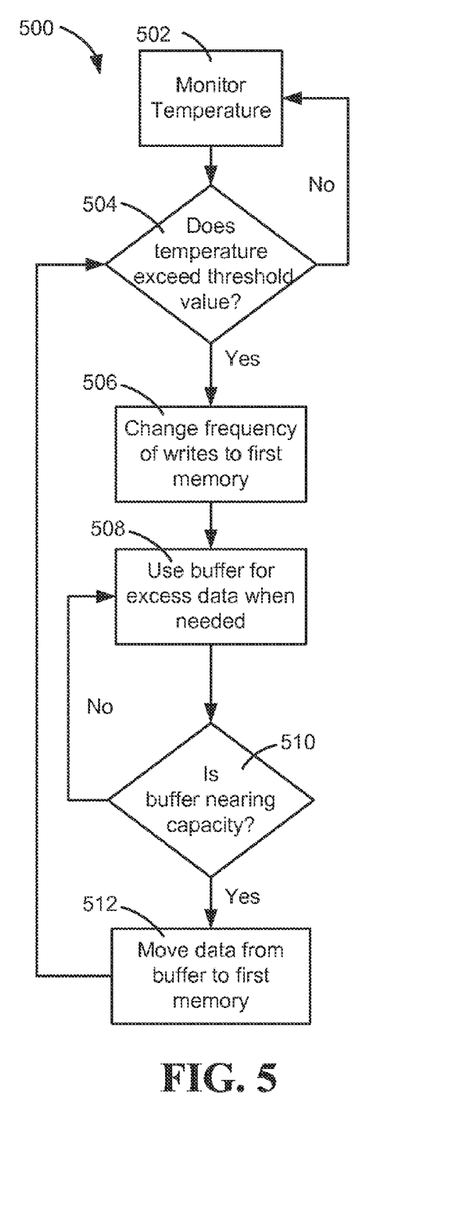
FIG. 5 is a flowchart of an illustrative embodiment of a method for temperature-based device operation.

Referring to FIG. 5, a flowchart of an illustrative embodiment of a method 500 for temperature-based device operation is shown. The method 500 may apply to a DSD with a first memory and a second memory used as a buffer. The method 500 may monitor a temperature of a DSD, at 502, and determine if a threshold temperature has been exceeded, at 504. If the threshold temperature has not been exceeded, temperature monitoring may continue, at 502. If the temperature does exceed the threshold temperature, the method 500 may direct that the frequency of writes to a first memory be changed, at 506.

A change in write frequency may be accomplished by: modifying a value stored in a register, which register is checked by a controller to set a write frequency; implementing a function or instruction set in the DSD firmware; designating a buffer or second memory as the destination for data writes; setting a flag which determines write modes for the DSD; inserting breaks into the writable data stream; any other methods of modifying write frequency; or any combination thereof. The write frequency can be changed by increasing or decreasing the frequency of writes, or by setting a maximum duration of continuous write operations.

If modifying the frequency of data write operations to a first memory at 506 results in excess data that is not being written to the first memory, the method 500 can direct that excess data be written to a buffer when needed, at 508. For example, if data is received at a rate higher than can be written to a first memory that is under a write frequency restriction, some or all of the received data can be written to a second memory, either temporarily or permanently. The excess data may be written to a cache memory or a second nonvolatile memory, such as nonvolatile solid state memory. For example, a write restriction may be imposed so that data may be written to the first memory for only 10% of drive operating time; the remaining 90% may be used to read from any memory, write to the second memory, remain idle, or other operations. In some embodiments, different writing restrictions may be imposed based upon a multiplicity of temperature thresholds, based upon a tiered threshold system. For example, at low temperatures data may be written to a first memory 100% of drive operating time; at a first temperature threshold, data writes may be restricted to 50% of drive operating time; at a second threshold, data writes may only be written to the first memory 10% of the time; and at a third threshold, data may not be written to the first memory at all, and data may only be written to the second memory.

Further, the method 500 may determine if the buffer is near capacity or above a threshold capacity, at 510. If there is sufficient space remaining, data can continue to be written to the buffer, at 508. If the buffer is near capacity or above the threshold capacity, the method 500 may move data from the buffer to another memory location, such as the first memory, at 512. Then, the method 500 can continue determining if the temperature of the DSD is above the threshold value, at 504, and direct that data be written to first memory or to the buffer accordingly, at 506 and 508.

The methods and devices described herein relate to temperature-based device operation, but other environmental factors may also be monitored, and device operation may be modified according to those factors. For example, environmental factors such as humidity, altitude, air pressure, physical shocks, or other factors may be monitored, and device operation can be modified according to those factors.

In accordance with various embodiments, the methods described herein may be implemented as one or more software programs running on a computer processor or controller, such as the controller 206. In accordance with another embodiment, the methods described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods described herein. Further, the methods described herein may be implemented as a computer readable medium including instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
    a first memory;
    a second memory less influenced by variations in temperature than the first memory;
    a temperature detection module adapted to:
        measure a temperature of the device;
        reduce a rate of storing data to the first memory without shutting down the first memory when the temperature exceeds a first temperature threshold;
        redirect data intended to be stored to the first memory, but that cannot be handled by the first memory due to the reduced rate of storing, to be stored to the second memory based on the second memory being less influenced by variations in temperature; and
        move data stored at the second memory to the first memory when the temperature falls below a second temperature threshold.

2. The device of claim 1 further comprising an interface, and the data intended for the first memory is received from a host at the interface, wherein a Logical Block Address (LBA) received from the host that is associated with the data is mapped to a physical location of the first memory.

3. The device of claim 1 wherein the device moves data stored at the second memory to the first memory when the second memory reaches a capacity threshold.

4. The device of claim 1 wherein the first memory is a disc memory and the second memory is a solid state memory.

5. The device of claim 4 further comprising a heat-assisted magnetic recording device to assist writing data to the disc memory.

6. The device of claim 1 wherein reducing the rate of storing data comprises reducing, but not eliminating, an amount of data written to the first memory and increasing an amount of data written to the second memory to compensate for the reduced rate of storing to the first memory.

7. The device of claim 1 comprising the temperature detection module further adapted to implement operating limitations for the device based on the temperature.

8. The device of claim 7 wherein the operating limitations include preventing background diagnostics from executing without shutting down the first memory.

9. The device of claim 1 wherein the temperature detection module is further adapted to:
    determine a length of time the device operates above the first temperature threshold; and
    reduce the rate of storing data to the first memory when the length of time exceeds a threshold time.

10. The device of claim 9 wherein the temperature detection module is further adapted to keep a log of the length of time and the temperature.

11. The device of claim 1 comprising the temperature detection module further adapted to:
    reduce the rate of storing data to the first memory by storing a first portion of data intended for the first memory to the first memory and store a second portion of data intended for the first memory to the second memory.

12. The device of claim 1 further comprising the device configured to service all data read commands directed to the first memory with the first memory after the temperature exceeds the first temperature threshold.

13. A device comprising:
    a data storage device including:
        a first memory;
        a second memory less susceptible to write errors at high temperatures than the first memory; and a controller configured to:
  detect a temperature of the data storage device;
  reduce a rate of storing data to the first memory without shutting down the first memory when the temperature exceeds a first temperature threshold; and
  store data intended for the first memory to the second memory due to the temperature exceeding the first temperature threshold.

14. The device of claim 13 wherein the data storage device is configured to:
  move data stored at the second memory to the first memory when the temperature falls below a second temperature threshold; and
  move the data intended for the first memory from the second memory to the first memory when the second memory reaches a capacity threshold, even if the temperature still exceeds the second temperature threshold.

15. The device of claim 13 wherein the controller is configured to reduce the rate of storing data by reducing, but not eliminating, an amount of data storage operations to the first memory and increase an amount of data storage operations to the second memory to compensate for the reduced rate of storing to the first memory.

16. A method comprising:
  detecting a temperature of a data storage device;
  reducing a rate of storing data to a first memory of the data storage device without ceasing operation of the first memory when the temperature exceeds a first temperature threshold;
  storing data intended for the first memory that cannot be handled by the reduced rate of storing to a second memory of the data storage device that is less influenced by temperature variations than the first memory.

17. The method of claim 16 further comprising:
  monitoring time values and corresponding temperature values; and
  modifying an operation of the data storage device based on the time values and corresponding temperature values.

18. The method of claim 17 further comprising:
  determining a length of time the data storage device operates above the first threshold temperature; and
  reducing the rate of storing data to the first memory when the length of time exceeds a threshold time.

19. The method of claim 16 wherein reducing the rate of storing data comprises:
  storing prevents storing the data intended for the first memory to the first memory; and
  moving data stored at the second memory to the first memory when the temperature falls below a second temperature threshold.

20. The method of claim 16 further comprising reducing the rate of storing data to the first memory when the temperature threshold has been exceeded and an error has been detected in the data written to a first memory.

* * * * *